United States Patent [19]

Hiyama

[11] Patent Number: 5,594,871
[45] Date of Patent: Jan. 14, 1997

[54] DATA COMMUNICATION METHOD AND DATA COMMUNICATION SYSTEM USING DATA COMMUNICATION APPARATUS THEREIN

[75] Inventor: Yutaka Hiyama, Yokosuka, Japan

[73] Assignee: Canon Kabushiki Kaisha, Tokyo, Japan

[21] Appl. No.: 342,651

[22] Filed: Nov. 21, 1994

Related U.S. Application Data

[63] Continuation of Ser. No. 871,894, Apr. 21, 1992, abandoned.

[30] Foreign Application Priority Data

Apr. 25, 1991 [JP] Japan .................................. 3-122468

[51] Int. Cl.⁶ ........................... G06F 13/10; G05B 23/02; G08C 15/12
[52] U.S. Cl. ................................ 395/200.09; 340/825.08; 340/870.13
[58] Field of Search ...................... 340/825.08, 825.13, 340/825.14, 825.51, 870.13, 870.14, 505, 825.47, 825.44, 825.22, 825.26, 825.27; 370/84, 85.6, 85.8, 95.2; 379/107, 100, 106; 455/5.1; 364/DIG. 1; 395/200.09, 200.19

[56] References Cited

U.S. PATENT DOCUMENTS

| | | | |
|---|---|---|---|
| 4,056,684 | 11/1977 | Lindstrom | 379/106 |
| 4,469,917 | 9/1984 | Shelley | 379/107 |
| 4,598,363 | 7/1986 | Clark et al. | 364/DIG. 1 |
| 4,646,160 | 2/1987 | Iizuka et al. | 379/100 |
| 4,847,892 | 7/1989 | Shelley | 379/107 |
| 4,860,005 | 8/1989 | DeLuca et al. | 340/825.47 |
| 4,894,649 | 1/1990 | Davis | 340/825.44 |
| 4,940,974 | 7/1990 | Sojka | 340/825.08 |
| 5,012,510 | 4/1991 | Schaubs et al. | 340/825.08 |
| 5,046,066 | 9/1991 | Messenger | 370/95.2 |
| 5,053,883 | 10/1991 | Johnson | 340/825.08 |
| 5,239,575 | 8/1993 | White et al. | 379/107 |

OTHER PUBLICATIONS

"Personal Computer Data Communication Protocol Handbook," Asahi Newspaper Corporation, 14th edition, Dec. 20, 1988, p. 18 and attached page, copies in Japanese and English.

Primary Examiner—Alyssa H. Bowler
Assistant Examiner—Mark H. Rinehart
Attorney, Agent, or Firm—Morgan & Finnegan L.L.P.

[57] ABSTRACT

The data communication system according to the present invention executes data transmissions and data receptions between a main unit and a plurality of terminals by the polling/selecting method. The main unit comprises a key input section and a memory that stores information on communication periods of each terminal, which were set by using the key input section. In a case where polling/selecting is performed, the communication periods of the designated terminal are read. The main unit further comprises a timer. The present time which is read from the timer is compared with the designated communication periods which are read from the memory and whether or not the present time is within the communication periods is determined. In the case where the time is within the communication periods, the main unit executes the polling/selecting processing to the terminal and the data communication is performed. On the other hand, in the case where the time is out of the designated communication periods, the main unit does not perform any processing to the terminal. The above-described processes are sequentially executed to each of the plurality of terminals.

14 Claims, 6 Drawing Sheets

DATA COMMUNICATION METHOD AND DATA COMMUNICATION SYSTEM USING DATA COMMUNICATION APPARATUS THEREIN

This a Continuation of application Ser. No. 07/871,894, filed Apr. 21. 1992, now abandoned.

BACKGROUND OF THE INVENTION

1. FIELD OF THE INVENTION

The present invention relates to a data communication method and a communication system using a communication apparatus which transmits or receives data between a plurality of terminals, and more particularly, to a data communication system which utilizes the data communication method and apparatus to perform a wireless data communication by the polling/selecting method.

2. RELATED ART

The conventional wireless data communication apparatus, in which data communications with a main unit are performed by a plurality of terminals, generally utilizes the polling/selecting method. In the polling method, the main unit periodically performs polling for a data transmission on each terminal. In the case where a terminal affirmatively responded to the polling, the main unit receives the data which was transmitted from the terminal. In the selecting method, the main unit periodically performs selecting for a data reception on each terminal. In the case where a terminal affirmatively responds to the selecting, the main unit transmits the data to the terminal. Thus, the main unit in the conventional wireless data communication system periodically executes the aforementioned polling/selecting processing regardless of the operational status of the terminal since the main unit cannot grasp the status of each terminal. For example, in the case where the power source of the terminal is set to OFF, time for polling/selecting or waiting time for a response from the terminal will be wasted. Thus, in the conventional wireless data communication system, there is the drawback such that efficiency of the data processing is decreased since unnecessary data communications processings are executed and waiting time for polling/selecting for the rest of terminals becomes longer.

SUMMARY OF THE INVENTION

Accordingly, it is an object of the present invention to provide a data communication apparatus which avoids the execution of useless data communication processing and improves the efficiency of data processing.

According to the present invention, the foregoing object is attained by providing a data communication apparatus which performs data communications with a terminal comprising:

setting means for setting information on communication periods to the terminal;

discrimination means for discriminating whether or not the terminal is within the communication periods based on the communication period information which were set by the setting means; and communication means for executing a data communication to the terminal which was discriminated, by the discrimination means, to be within the data communication periods.

It is another object of the present invention to provide a data communication method which avoids the execution of useless data communication processing and improves the efficiency of data processing.

According to the present invention, the foregoing object is attained by providing a data communication means which performs data communications with a terminal comprising the steps of:

setting information on communication periods to the terminal;

discriminating whether or not the terminal is within the communication periods based on the communication period information which were set by the setting step; and executing a data communication to the terminal which was discriminated, by the discrimination step, to be within the data communication periods.

It is another object of the present invention to provide a data communication system which avoids executing useless data communication processing and improves the efficiency in data processing.

According to the present invention, the foregoing object is attained by providing a data communication system that performs data communications between a main unit and a plurality of terminals, wherein the main unit comprises:

setting means for setting information on communication periods of each of the plurality of terminals;

discrimination means for discriminating whether or not the terminal is within the communication periods based on the communication period information which were set by the setting means; and communication means for executing a data communication to the terminal which was discriminated, by the discrimination means, to be within the data communication periods.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail in accordance with the accompanying drawings.

[First Embodiment]

Figure 1:
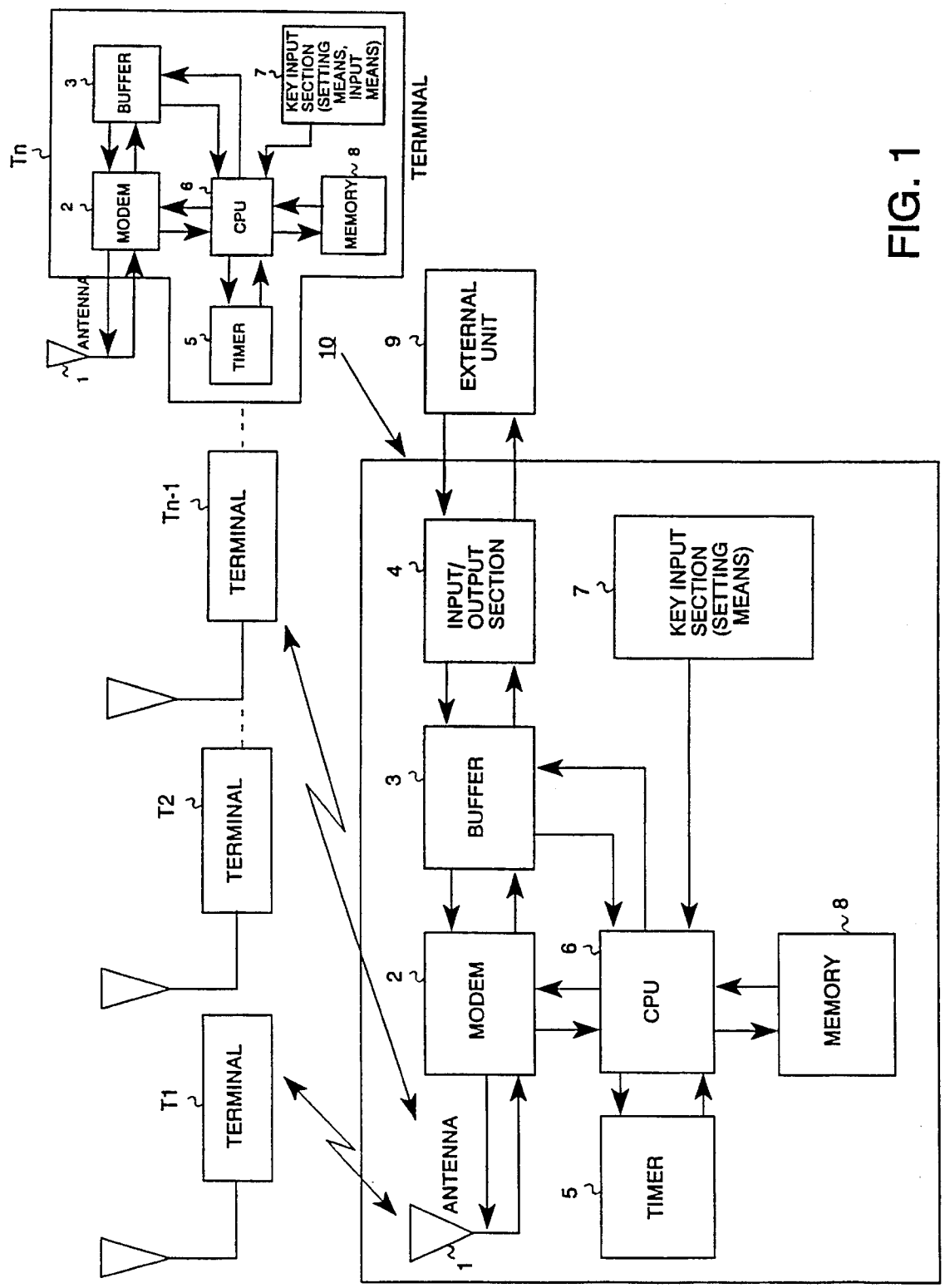
FIG. 1 is a block diagram which illustrates a general configuration of the wireless data communication system acceding to the present invention.

FIG. 1 is a block diagram which illustrates a general configuration of the wireless data communication system according to the present embodiment.

The wireless data communication system mainly comprises the main unit 10 which is a control station and a plurality of terminals $T_1$-$T_n$ which belong to the main unit 10. The antenna 1 receives data from the terminals ($T_1$-$T_n$) as well as transmits data to the terminals ($T_1$-$T_n$) from the main unit 10. The modem 2 demodulates the data received through the antenna 1 to the NRZ (Non Return to Zero) signal which is the reception data. Furthermore, the modem 2 modulates the NRZ signal, the transmission data which is transmitted to a terminal, to a high-frequency signal, and outputs it to the antenna 1. The buffer 3 temporarily stores either transmission data or reception data. The input/output section 4 outputs reception data from the terminals ($T_1$-$T_n$) to the external unit 9 and inputs transmission data to the terminals ($T_1$-$T_n$) from the external unit 9.

Figure 6:
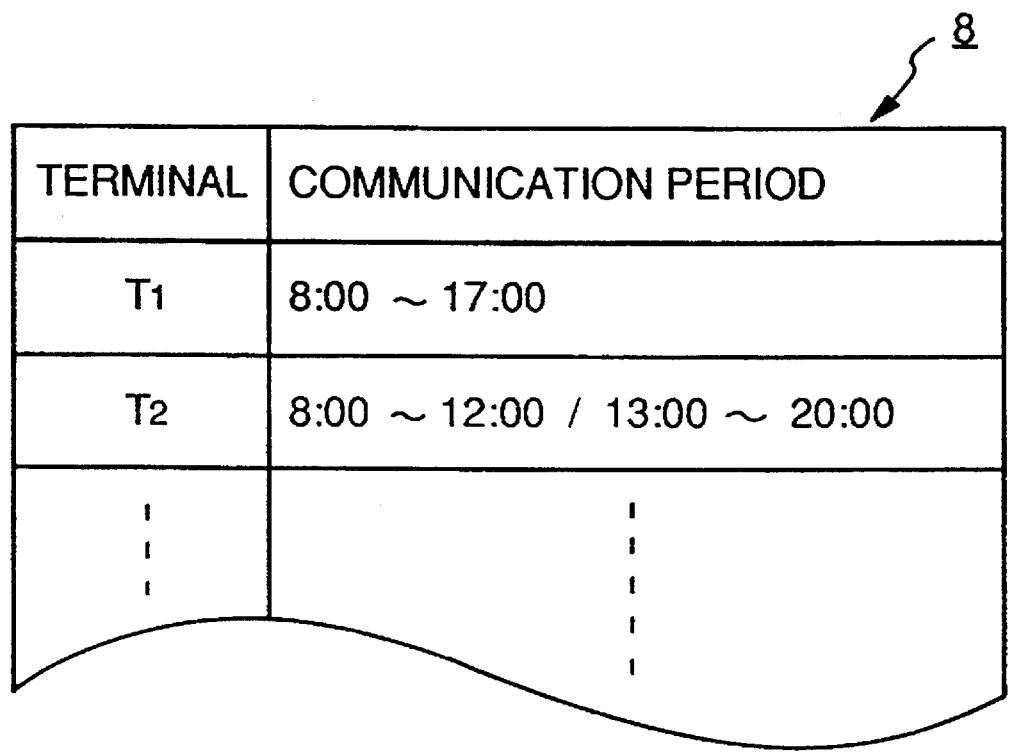
FIG. 6 is a diagram which illustrates the storage state of the memory during the communication period.

The timer 5 keeps a time which is referenced to determine whether or not the time is within the designated communication period during which the terminal can send or receive data. The CPU 6 controls a transmission channel or reception channel of the modem 2 and executes the polling/selecting processing at the frequency which was respectively predetermined for each terminal. The CPU 6 also controls read/write with the data in the buffer 3 and processes commands and data which were inputted through the key input section 7. The memory 8 comprises storage medium, e.g. a ROM which stores programs of the CPU 6 in advance and RAM which stores various data. The CPU 6 further controls write/read programs and various data in the memory 8. In the case where communication periods to each of the terminals ($T_1$-$T_n$) are set through the key input section 7, the CPU 6 stores these periods in the memory 8. As shown in FIG. 6, the memory 8 stores the communication periods which were determined to correspond to each terminal.

The reception data processing and transmission data processing in the main unit 10 are now described. A wireless signal from each of the terminals is received through the antenna 1 and is converted to a high-frequency signal. The high-frequency signal is demodulated by the modem 2 and becomes an NRZ signal, reception data. Then, the reception data is temporarily stored in the buffer 3 in order to deal with the difference between the wireless communication speed and the data processing speed of the main unit. After this process, the reception data is outputted to the external unit 9 which is connected through the input/output section 4.

On the other hand, an NRZ signal, transmission data, to each of the terminals is inputted to the input/output section 4 from the connected external unit 9. After the transmission data is temporarily stored in the buffer 3, the data is modulated by the modem 2 and becomes a high-frequency signal. The high-frequency signal is transmitted to the terminals ($T_1$-$T_n$) through the antenna 1.

Figure 2:
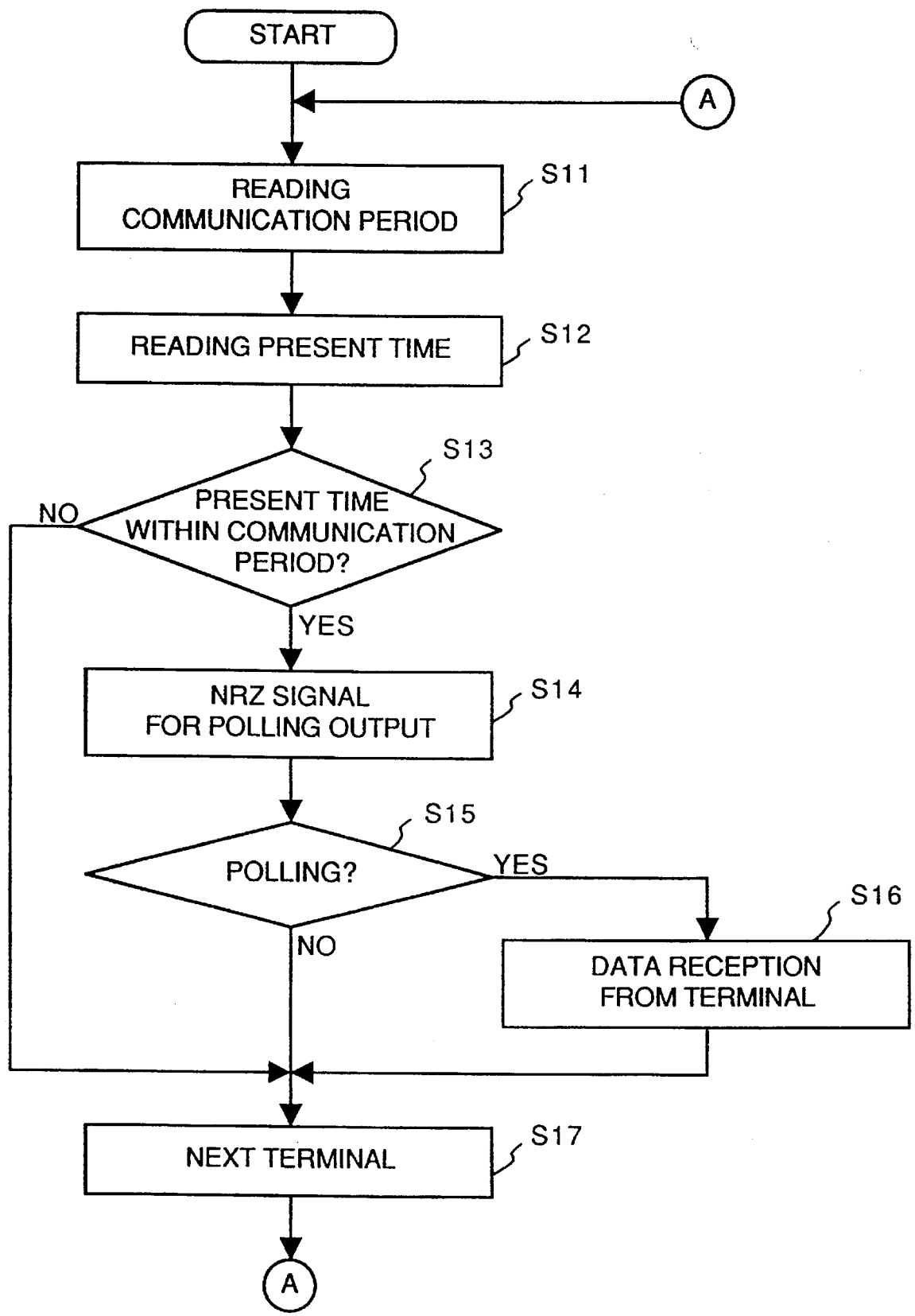
FIG. 2 is a flowchart which illustrates the procedure for the operation at the polling processing in the wireless data communication system.
Figure 3:
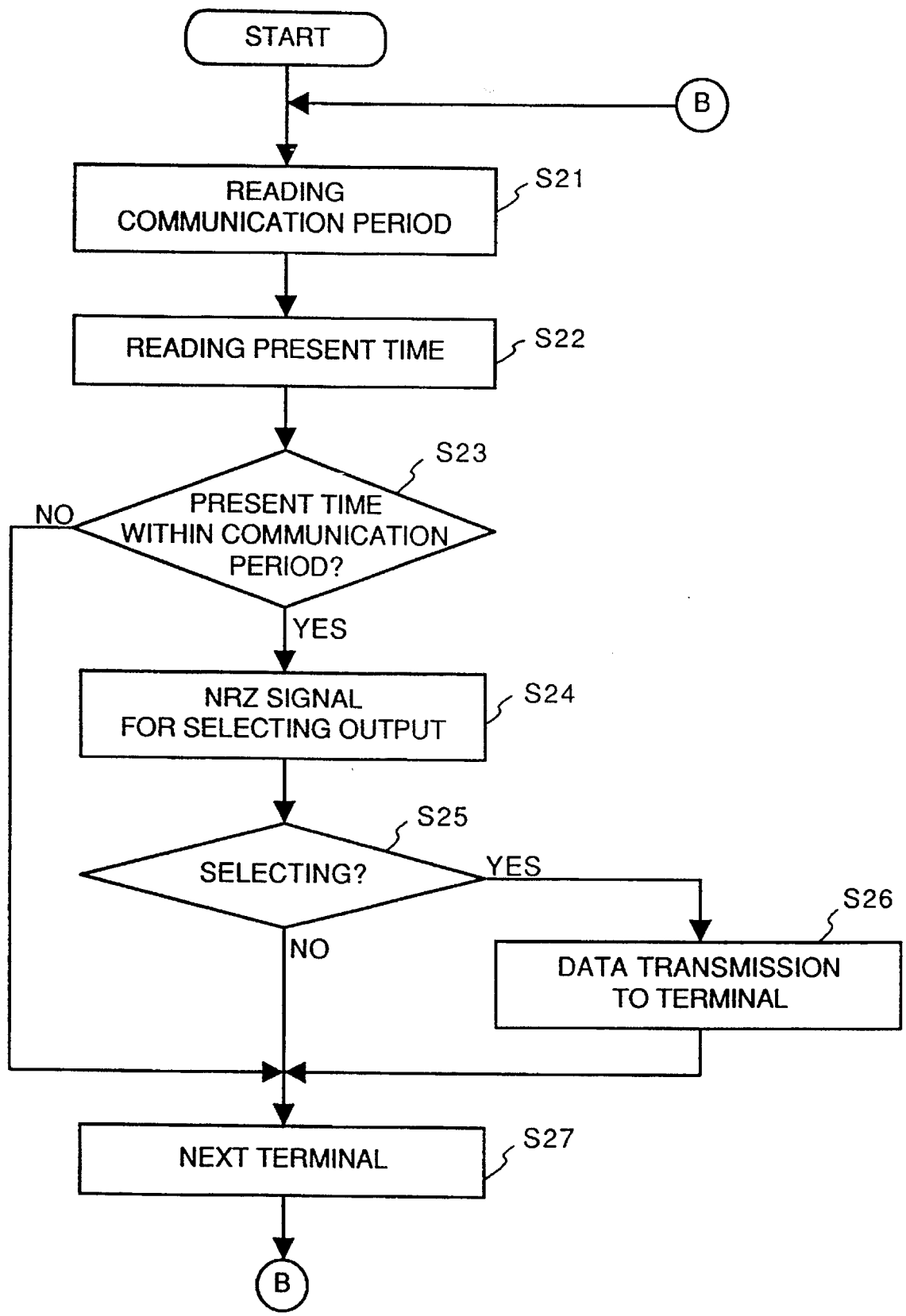
FIG. 3 is a flowchart which illustrates the procedure for the operation at the selecting processing in the system.

The polling/selecting operation of the CPU 6 in the aforementioned wireless data communication system is described accompanying with FIGS. 2 and 3.

FIG. 2 is a flowchart which illustrates the procedure for the operation of the polling processing performed by the main unit 10. In step S11, the CPU 6 reads the predetermined communication periods of the terminal $T_1$ which are stored in the memory 8. In step S12, the present time is read from the timer 5 and, in step S13, the CPU 6 determines whether or not the time is within the communication periods. In the case where the time is out of the communication periods of the terminal $T_1$, the process proceeds to step S17 where the control is moved onto the next terminal. In the case where the time is within the communication period, the step proceeds to step S14 where an NRZ signal for polling is output to the modem 2.

The signal for polling is modulated by the modem 2 and transmitted to the terminal $T_1$ through the antenna 1. In the case where the terminal $T_1$ receives the polling signal, the terminal $T_1$ sends either affirmative or negative response for the data transmission. This response signal is received by the main unit 10 through the antenna 1 and converted to the high-frequency signal. The signal is then demodulated by the modem 2 to an NRZ signal and transmitted to the CPU 6. In the case where the terminal $T_1$ sends an affirmative response for the polling signal, the terminal $T_1$ transmits transmission data to the main unit 10.

In step S15, in the case where the affirmative response for polling is recognized, the process proceeds to step S16 where the main unit receives the transmission data from the terminal $T_1$.

When the polling processing to the terminal $T_1$ is completed, the control is moved onto the terminal $T_2$ and the process returns to step S11. When the process returns to step S11, the communication periods of the terminal $T_2$ which are stored in the memory 8 are read and the aforementioned process is repeated. Similarly, the polling processing is sequentially executed to the terminals $T_2$-$T_n$).

FIG. 3 is a flowchart which illustrates the procedure for the operation at the selecting processing in the system. Since steps S21-S23 are same as steps S11-S13 in FIG. 2, the explanation is omitted here.

In step S24, the NRZ signal for selecting is outputted to a terminal. The signal for selecting is modulated by the modem 2 and transmitted to the terminal $T_1$ through the antenna 1. When the terminal $T_1$ receives the selecting signal, either an affirmative or negative response is sent to the main unit 10. In the case where the terminal $T_1$ confirms the selecting, the status of the terminal $T_1$ becomes "waiting". The response signal is received by the main unit 10 through the antenna 1 and converted to the high-frequency signal. Then, the signal is demodulated by the modem 2 and outputted to the CPU 6.

When the CPU 6 recognizes the affirmative response signal from the terminal $T_1$ in step S25, the process proceeds to step S26 where the data transmission to the terminal $T_1$ is executed.

When the selecting processing to the terminal $T_1$ is completed, the control is moved onto the next terminal $T_2$ in step S27. The process then returns to step S21. When the process returns to step S21, the communication periods of the terminal $T_2$ are read from the memory 8 and the aforementioned process is repeated. Similarly, the selecting processing to the terminals $T_2$-$T_n$ is sequentially repeated.

As described above, according to the present embodiment, useless polling/selecting is prevented since the communication periods to the terminals $T_1$-$T_n$ are predetermined through the key input section 7. The polling/selecting processing is not executed on the terminal which was discriminated as not being within the communication periods, by comparing the present time kept by the timer 5 with the predetermined communication periods.

[Second Embodiment]

According to the first embodiment, it is set up that the communication periods to the terminals are set through the key input section 7 of the main unit. However, the present invention is not limited to the first embodiment. For example, the communication periods can be respectively set from the terminal side. The setting data can be set in a manner such that the data is transmitted to the main unit from the terminals. In the second embodiment, the setting procedure is described.

The general configuration of the wireless data communication system in the second embodiment is similar to the one in FIG. 1. Therefore, the explanation is omitted here. However, the difference is that each of the terminals $T_1$-$T_n$ accommodate a key input section (i.e., setting means or input means) shown in FIG. 1 to set communication periods.

Figure 4:
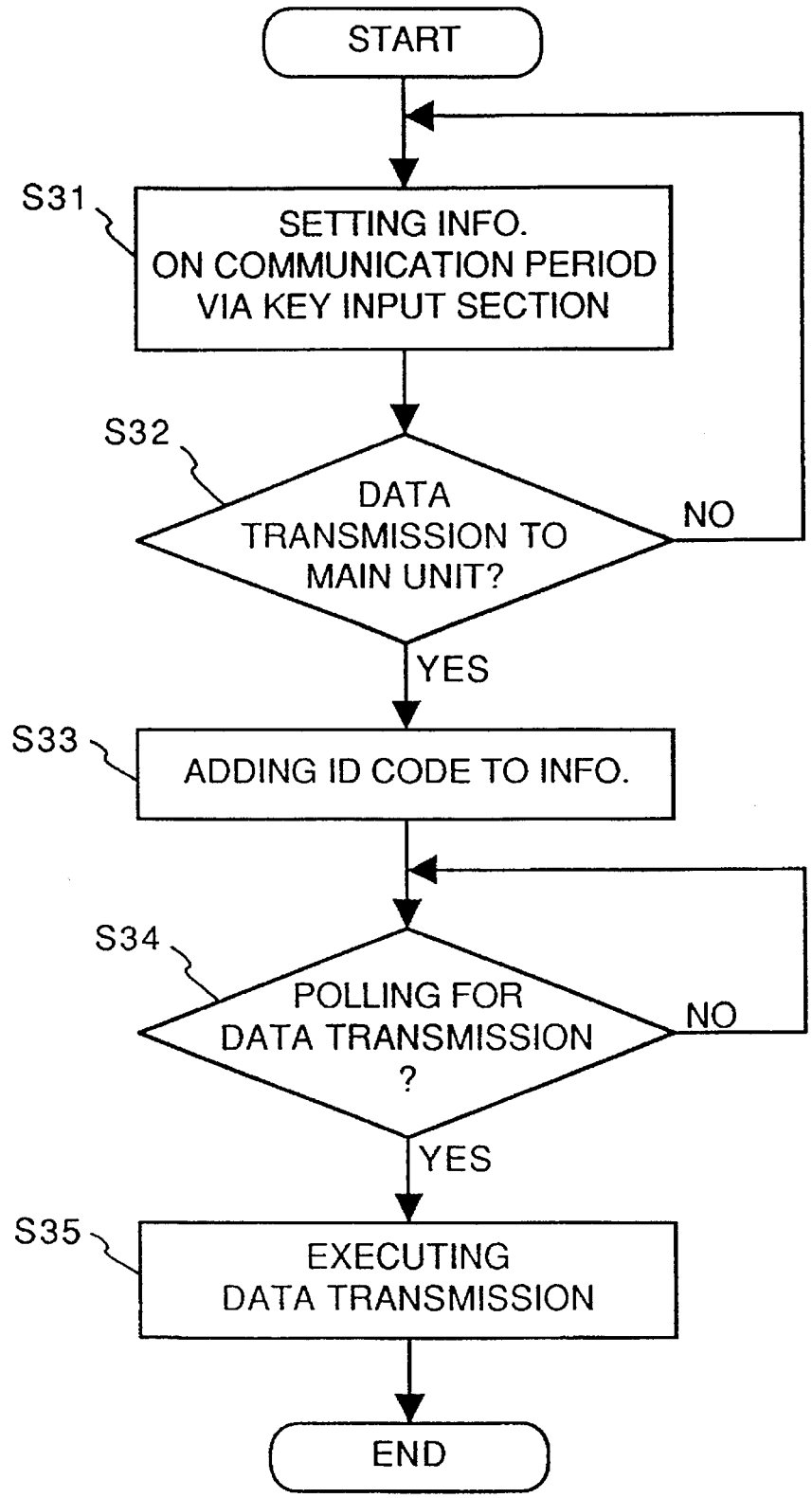
FIG. 4 is a flowchart which illustrates the procedure for setting a communication period from the terminal side according to the second embodiment.

FIG. 4 is a flowchart which illustrates the procedure for setting communication periods in each terminal according to the second embodiment. In step S31, the information on communication periods of a terminal is inputted by the key input section of the terminal. When the information input is completed, in step S32, the instruction for transmitting the information to the main unit 10 is inputted by the key input section of the terminal. When the transmission instruction is inputted, a code which indicates the information is on the communication periods is added and this is designated as transmission data. Then, in step S34, the terminal waits for polling for the data transmission from the main unit 10 in order to transmit the data to the main unit 10 by the polling method. When the terminal recognizes the polling for the data transmission from the main unit 10, the transmission data which was generated in step S33 is transmitted to the main unit 10.

Next, the process of the case in which the information on the communication periods is received by the main unit 10 is described.

Figure 5:
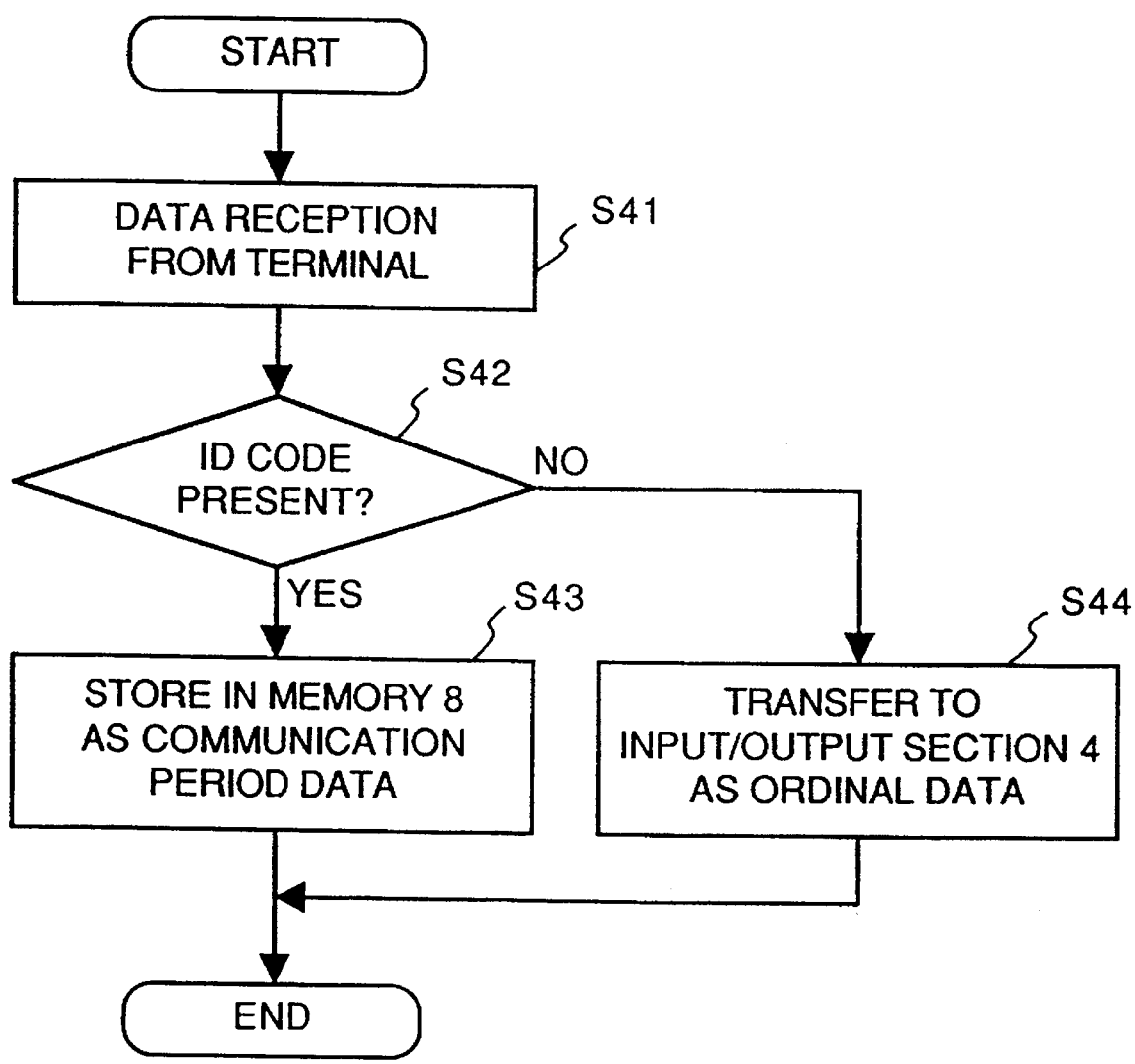
FIG. 5 is a flowchart which illustrates the procedure for processing in the main unit when communication periods are set in the terminal according to the second embodiment.

FIG. 5 is a flowchart which illustrates the processing procedure when communication periods of each of the terminals are set in the main unit 10. In step S41, the data from the terminal is received, and in step S42, whether or not the information is on the communication periods is checked. This is determined by the aforementioned code which was added in step S33. In step S42, in the case where the code is detected, the process proceeds to step S43 where the information is stored with an identification code of the terminal in the memory 8 as the communication period data as shown in FIG. 6. In the case where the code is not detected, the process proceeds to step S44 where the data is transferred to the input/output section 4 and the ordinal data processing is executed.

Thus, setting the communication periods in the terminal is executed.

Needless to say, there is a capability for setting communication periods from both the main unit 10 and the terminals.

In the above-described embodiments, the communication periods when the main unit 10 can communicate with the terminals are set, however, it can be applied to the period when the main unit 10 is prohibited to communicate with the terminals.

Furthermore, in the above-described embodiments, the polling processing and the selecting processing are set in the same periods, however, these periods can be separately set.

Still further, in the above-described embodiments, the polling/selecting method is used as a communication method, however, any other communication method can be used.

As described above, according to the data communication system which utilized the data communication method and apparatus according to the present invention, useless execution of data communication processing is prevented and efficiency in the data processing is improved.

Furthermore, the present invention can be applied to the system comprising either a plurality of units or a single unit. It is needless to say that the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A data communication apparatus which performs data communications with a plurality of terminals, comprising:

reception means for receiving, from the plurality of terminals, a plurality of informations each indicating a time period when each of the plurality of terminals may be accessed;

storage means for storing the plurality of informations received by the reception means as communication periods of the plurality of terminals, respectively;

timer means for measuring a present time;

discrimination means for discriminating whether or not the present time is contained in each of the communication periods, stored in the storage means, of the plurality of terminals; and communication means for executing the data communication with each of the plurality of terminals whose communication period is discriminated, by the discrimination means, to contain the present time.

2. The data communication apparatus according to claim 1, wherein the communication means executes a data communication by the polling method with each of the plurality of terminals whose communication period is discriminated to contain the present time by the discrimination means.

3. The data communication apparatus according to claim 1, wherein the communication means executes a data communication by the selecting method with each of the plurality of terminals whose communication period is discriminated to contain the present time by the discrimination means.

4. The data communication apparatus according to claim 1, wherein the communication means executes a wireless data communication with each of the plurality of terminals whose communication period is discriminated to contain the present time by the discrimination means.

5. The data communication apparatus according to claim 1, wherein the reception means checks whether or not a received information is the information indicating a time period when any one of the terminals may be accessed.

6. The data communication apparatus according to claim 1, wherein the discriminating means reads out the communication periods from the storage means one after another, and discriminates whether or not the present time is contained in the read out communication period.

7. The data communication apparatus according to claim 1, wherein each of the time periods is set at the plurality of terminals, respectively and an information indicating the set time period is transmitted to the data communication apparatus from each of the plurality of terminals.

8. The data communication method which performs data communication with a plurality of terminals, comprising the steps of:

receiving, from the plurality of terminals, a plurality of information each of which indicates a time period when each of the plurality of terminals may be accessed;

storing the plurality of informations received by the receiving step as communication periods of the plurality of terminals, respectively;

measuring a present time;

discriminating whether or not the present time is contained in each of the communication periods, stored by the storing step, of the plurality of terminals; and executing the data communication with each of the plurality of terminals whose communication period is discriminated, by the discriminating step, to contain the present time.

9. The data communication method according to claim 8, wherein the communication step execute a data communication by the polling method with each of the terminals whose communication period is discriminated to contain the present time by the discriminating step.

10. The data communication method according to claim 8, wherein the communication step executes a data communication by the selecting method with each of the terminals whose communication period is discriminated to contain the present time by the discriminating step.

11. The data communication method according to claim 8, wherein the communication step executes a wireless data communication with each of the terminals whose communication period is discriminated to contain the present time by the discriminating step.

12. The data communication method according to claim 8, further comprising a step of checking whether or not a received information is the information indicating a time period when any one of the terminals may be accessed.

13. The data communication method according to claim 8, further comprising a step of reading out the stored communication periods one after another, and the discriminating step discriminates whether or not the present time is contained in the read out communication period.

14. The data communication apparatus according to claim 8, wherein each of the time periods is set at the plurality of terminals, respectively and an information indicating the set time period is transmitted to the data communication apparatus from each of the plurality of terminals.

* * * * *